(12) United States Patent
Sinton et al.

(10) Patent No.: US 10,027,278 B2
(45) Date of Patent: Jul. 17, 2018

(54) CHARACTERIZATION OF SUBSTRATE DOPING AND SERIES RESISTANCE DURING SOLAR CELL EFFICIENCY MEASUREMENT

(71) Applicant: Sinton Consulting, Inc., Boulder, CO (US)

(72) Inventors: Ronald A. Sinton, Boulder, CO (US); Michael K. Forsyth, Golden, CO (US); Adrienne L. Blum, Denver, CO (US); James S. Swirhun, Boulder, CO (US)

(73) Assignee: SINTON CONSULTING, INC, Boulder, CO (US)

( * ) Notice: Subject to any disclaimer, the term of this patent is extended or adjusted under 35 U.S.C. 154(b) by 906 days.

(21) Appl. No.: 14/274,551

(22) Filed: May 9, 2014

(65) Prior Publication Data

US 2014/0333319 A1 Nov. 13, 2014

Related U.S. Application Data

(60) Provisional application No. 61/822,058, filed on May 10, 2013.

(51) Int. Cl.
*G01R 31/00* (2006.01)
*H02S 50/00* (2014.01)
*H02S 50/10* (2014.01)

(52) U.S. Cl.
CPC .............. *H02S 50/00* (2013.01); *H02S 50/10* (2014.12)

(58) Field of Classification Search
CPC .... G01R 31/2635; G01R 31/025; H02S 50/00
(Continued)

(56) References Cited

U.S. PATENT DOCUMENTS 4,205,265 A * 5/1980 Staebler ................. H02S 50/10
136/290
4,712,063 A * 12/1987 Osterwald .......... G01R 31/2603
136/290

(Continued)

OTHER PUBLICATIONS

Ronald A. Sinton, "*Possibilities for Process-Control monitoring of Electronic Material Properties during Solar Cell Manufacture*", 9th Workshop on Crystalline Silicon Solar Cell Materials and Processes, NREL NREL/BK-520-26941, pp. 67-73, Aug. 1999.

(Continued)

*Primary Examiner* — Giovanni Astacio-Oquendo
(74) *Attorney, Agent, or Firm* — Beyer Law Group LLP

(57) ABSTRACT

Short-circuit current, maximum power, and open circuit voltage during a single flash are determined by varying intensity, voltage, and current. An apparatus determines the substrate doping and the series resistance of the solar cell. The series resistance of the cell is determined from a voltage step from the maximum power voltage operating point to the open-circuit condition. Methods are described for determining the substrate doping from stepping or sweeping the voltage. The first uses a voltage step and finds the change in charge that results. This determines a unique doping if the series resistance is known. The second uses data for a case of varying current, voltage, and light intensity, and compares this data to the case of varying voltage and intensity with no current. By transposing both cases into the steady state, agreement between the two data sets is found for unique doping and series resistance values.

28 Claims, 10 Drawing Sheets

(58) Field of Classification Search
USPC .................. 324/501, 500, 750, 752, 765
See application file for complete search history.

(56) References Cited

U.S. PATENT DOCUMENTS

| | | | |
|---|---|---|---|
| 7,528,615 B2 * | 5/2009 | Shimotomai | G01J 1/08 |
| | | | 324/754.23 |
| 7,696,461 B2 | 4/2010 | Sinton et al. | |
| 2004/0020529 A1 * | 2/2004 | Schutt | H02S 50/10 |
| | | | 136/245 |
| 2009/0056798 A1 * | 3/2009 | Merchant | H01B 1/16 |
| | | | 136/256 |
| 2010/0201374 A1 * | 8/2010 | Vasilyev | G01R 31/2656 |
| | | | 324/538 |
| 2013/0000703 A1 * | 1/2013 | Lee | H01G 9/20 |
| | | | 136/252 |
| 2013/0042907 A1 * | 2/2013 | Ming-Nan | H01L 31/02168 |
| | | | 136/255 |
| 2014/0333319 A1 * | 11/2014 | Sinton | H02S 50/10 |
| | | | 324/501 |

OTHER PUBLICATIONS

R.A. Sinton and A. Cuevas, "*A quasi-steady-state open-circuit voltage method for solar cell characterization*", Proc. of the 16th European Photovoltaic Solar Energy Conference, Glasgow, UK, 2000.
M. J. Kerr, A. Cuevas, R.A. Sinton, "*Generalized analysis of quasi-steady-state and transient decay open circuit voltage measurements*", Journal of Applied Physics, AIP, 2002.
William Shockley, "*Electrons and Holes in Semiconductors*", D. Van Nostrand Company, NY. 1950 pp. 312.

* cited by examiner

CHARACTERIZATION OF SUBSTRATE DOPING AND SERIES RESISTANCE DURING SOLAR CELL EFFICIENCY MEASUREMENT

CROSS REFERENCE TO RELATED APPLICATIONS

This application claims priority of U.S. provisional patent application No. 61/822,058, filed May 10, 2013, entitled "Characterization Substrate Doping and Series Resistance During Solar Cell Efficiency Measurement," which is hereby incorporated by reference.

FIELD OF THE INVENTION

The present invention relates generally to solar cell testing. More specifically, the present invention relates to measuring solar cell parameters, substrate doping and series resistance using a single flash pulse.

BACKGROUND OF THE INVENTION

Conventional solar-cell testers typically report a set of parameters related to the current-voltage (I-V) curve shape at one-sun light intensity in addition to the power output of the solar cell. Typically, these parameters include: short-circuit current density (Jsc), open-circuit voltage (Voc), Power (Pmp), and fill factor (FF). One method to measure these parameters is described in U.S. Pat. No. 7,696,461. In this method, several light pulses are used, each of which corresponds to a different voltage measurement at the light intensity of interest (generally, one sun). The current and voltage data at the light intensity of interest that is obtained from each pulse are used to construct the characteristic I-V curve for the sample. With the use of a prescribed voltage profile that maintains a constant charge in the cell during the flash pulse, data that is equivalent to the steady-state data (voltage and current under a constant light intensity) is determined. This method uses multiple flashes to obtain the short circuit current, the maximum power point current and voltage, additional voltage points if desired, and the open-circuit voltage. Generally, this is the information reported from a measurement of a solar cell or module. While this is the most important information for rating the output power and performance of the solar cell or module, it is not a complete device physics characterization of the device. Often for process control or monitoring, it is desirable to have a more complete measurement profile of the solar cell or module including measurements of the series resistance and the substrate doping.

SUMMARY OF THE INVENTION

The present invention utilizes a single flash pulse rather than multiple pulses to report the necessary solar cell parameters as well as the substrate doping and series resistance of the solar cell at the maximum power point. The invention includes the following methods and results:

1) Short-circuit current ($J_{sc}$), maximum power point voltage ($V_{mp}$), current ($J_{mp}$) and power ($P_{mp}$), and the open circuit voltage ($V_{oc}$) are all reported from a single flash pulse. The maximum power point is determined under constant charge conditions giving an accurate measurement of the steady-state power for the cell or module.
2) Methods for measuring the doping ($N_{A,D}$) of a silicon substrate are described. This can be determined during this single light pulse, by varying the voltage, current, and intensity and analyzing the data in a prescribed manner. Multiple pulses may also be used to determine the doping.
3) Methods for determining the series resistance ($R_s$) of the solar cell are described. This parameter can be determined by evaluating the data at an abrupt step from the maximum power voltage to open-circuit voltage. It is also determined from varying voltage, intensity, and current and analyzing the data in a prescribed manner.
4) U.S. Pat. No. 7,696,461 describes an apparatus that maintained constant charge in the solar cell or module during the measurement in order that the measured data corresponds with the data that would result from a steady state measurement. Here we describe a method for analyzing data that is not at constant charge. Instead, a prescribed method is used to correct for the transient effects present in non-constant charge data in order to report steady-state data. This permits the use of data in which the voltage, current, and light intensity can vary in any way during the measurement, and the data can be analyzed and corrected in order that it will correspond to the steady state results.

BRIEF DESCRIPTION OF THE DRAWINGS

The invention, together with further advantages thereof, may best be understood by reference to the following description taken in conjunction with the accompanying drawings in which.

Measurement of short-circuit current, maximum power, and open-circuit voltage is shown in FIG. 1.

Figure 7:
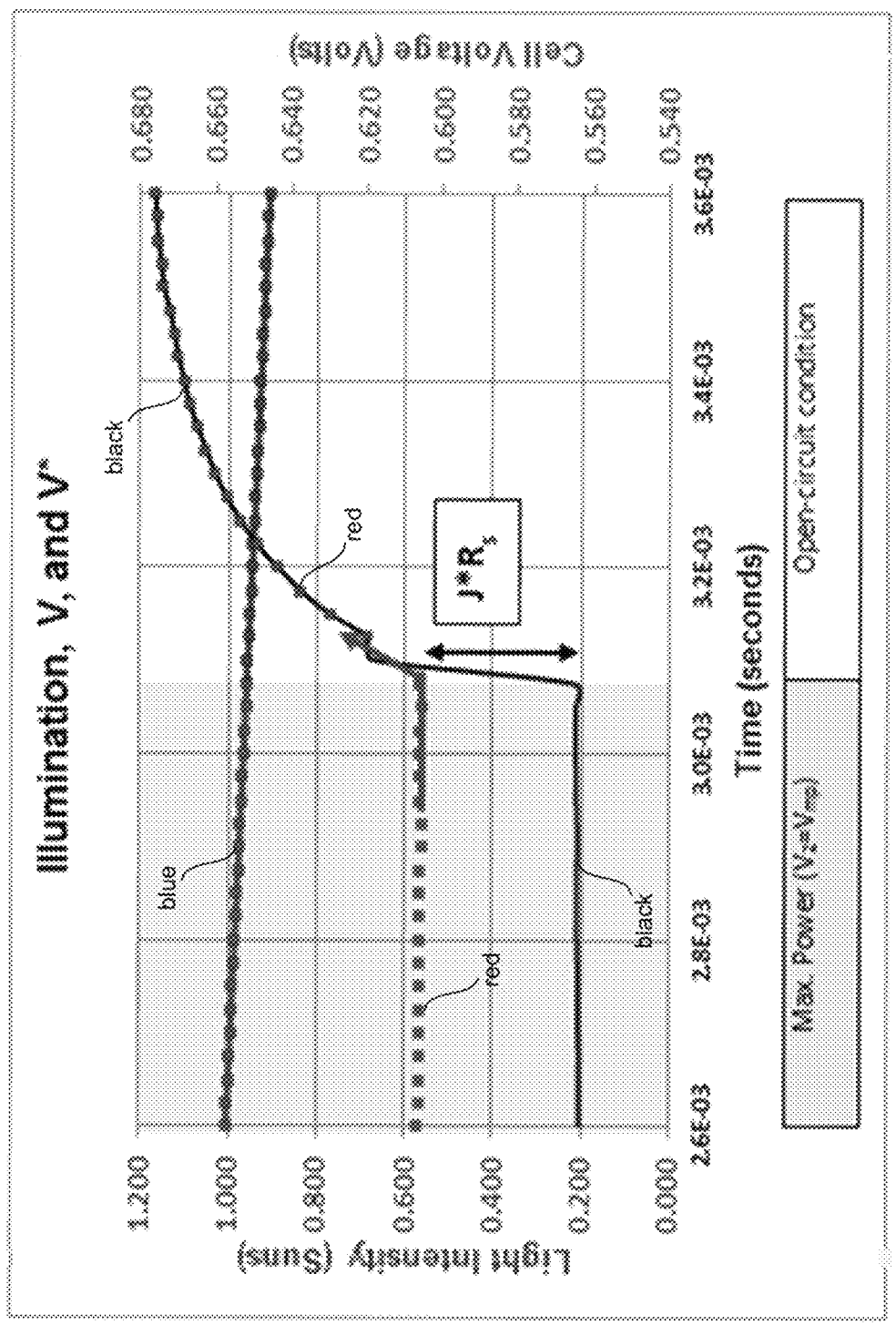

An alternative method to determine $R_s$ is demonstrated in FIG. 7.

Figure 6:
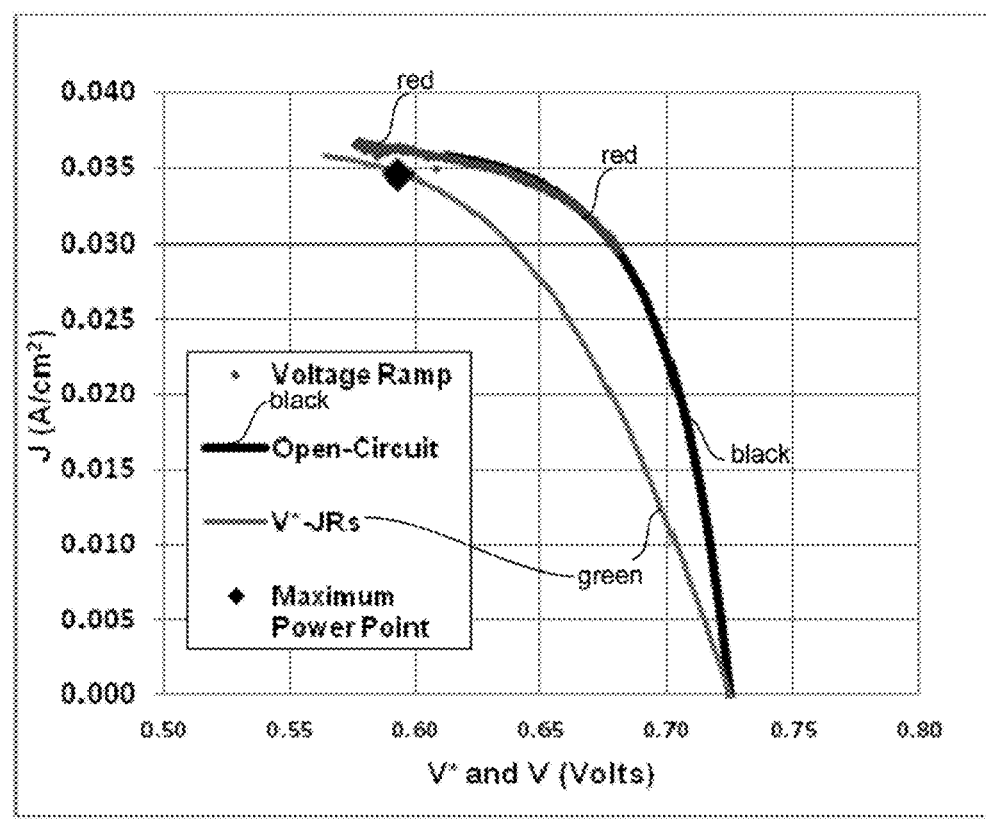
FIG. 6 shows the evaluation of the data from FIGS. 4 and 5 using equations 2, 3, 4, 5, and 6.
Figure 8:
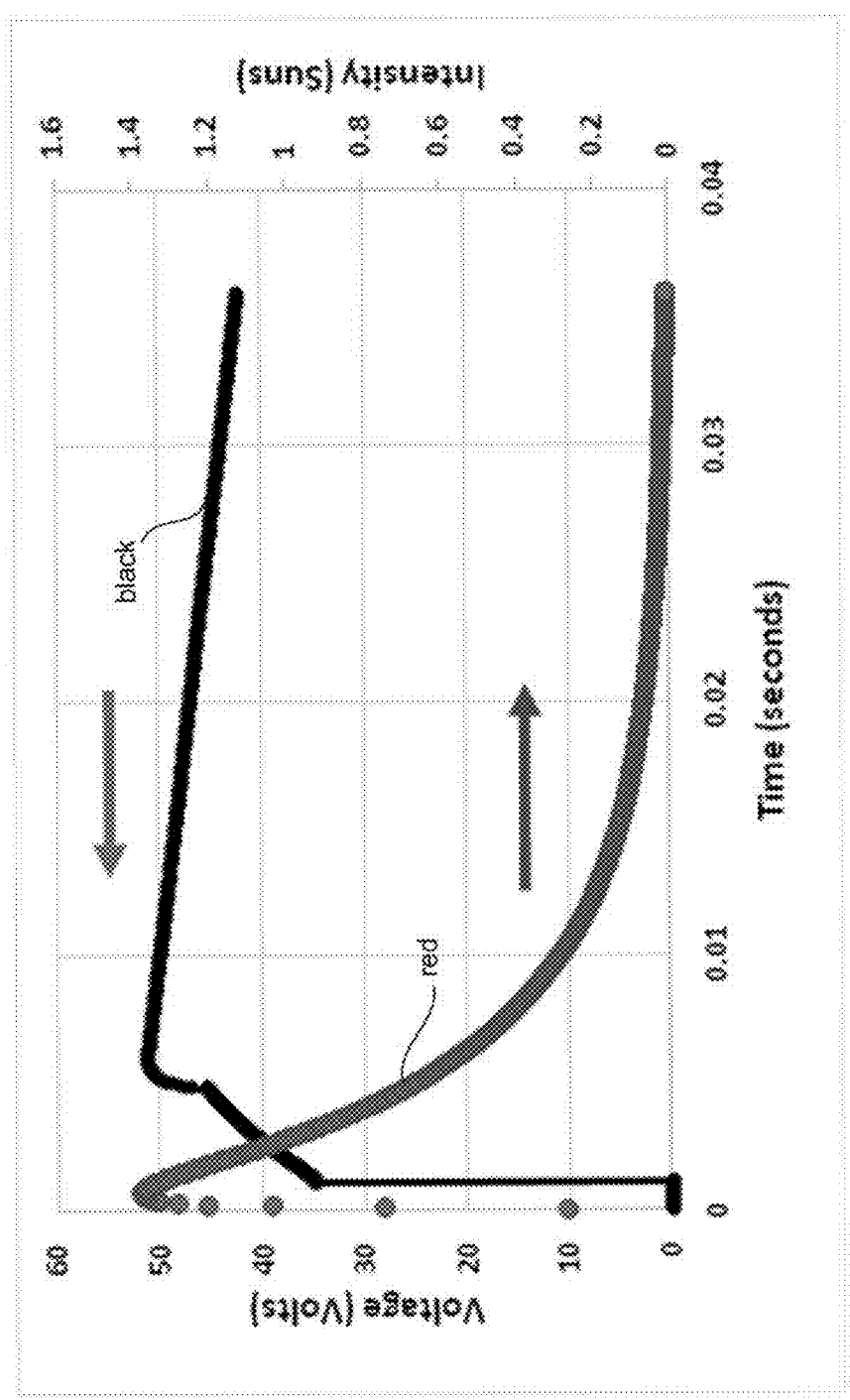

FIG. 8 is an illustration of the voltage profile (black) sequence that would acquire all of the data required for the analysis in FIG. 6 in a single flash (light intensity in red).

Figure 9:
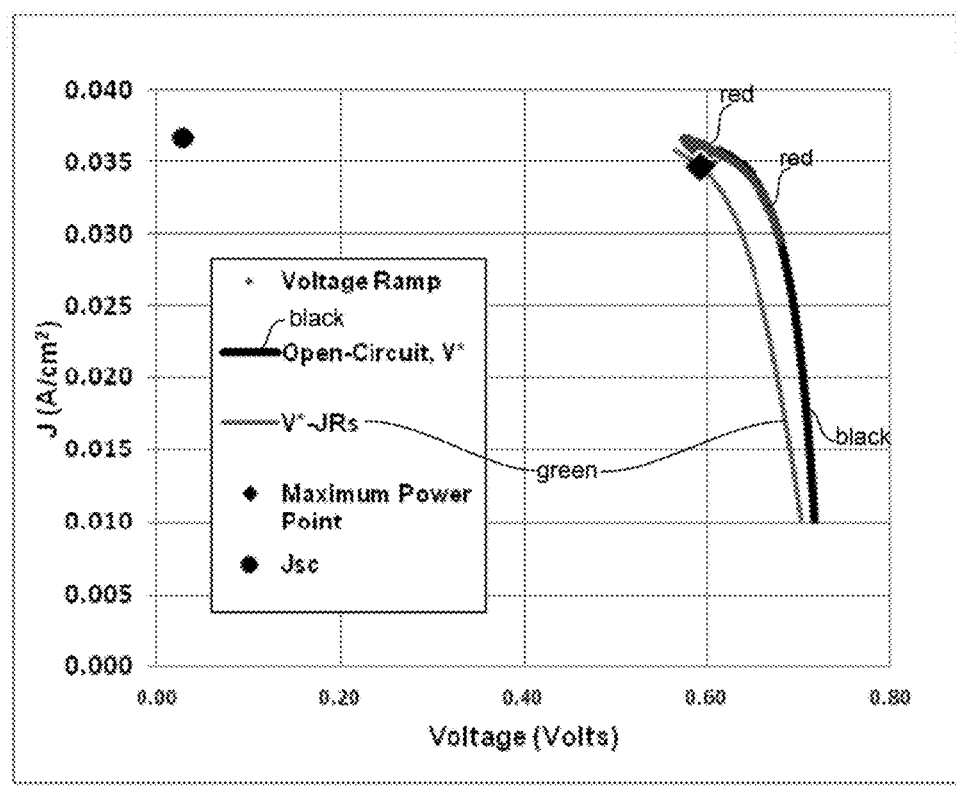

FIG. 9 shows the evaluation that would result from the sequence in FIG. 8 using equations 2, 3, 4, 5, and 6.

Figure 10A:
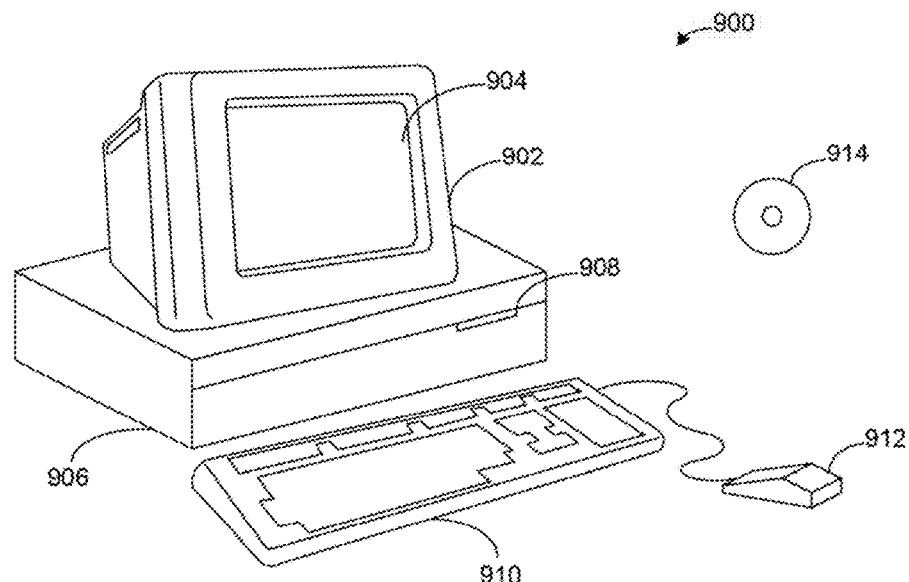
Figure 10B:
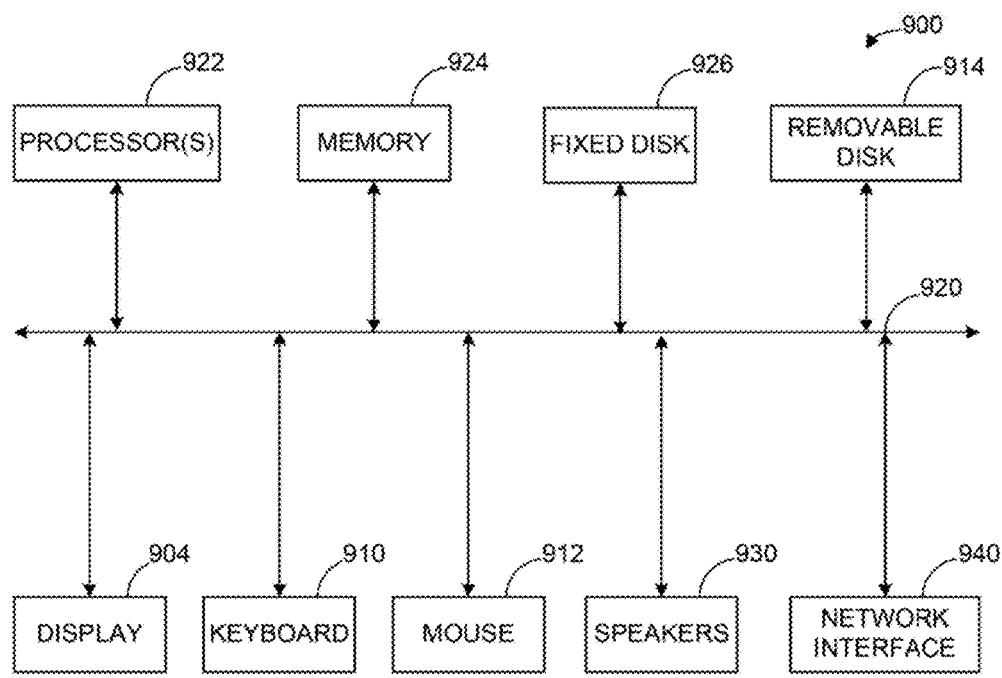

FIGS. 10A and 10B illustrate a computer system suitable for implementing embodiments of the present invention.

DETAILED DESCRIPTION OF THE INVENTION

The following publications are hereby incorporated by reference: [1] Ronald A. Sinton, Possibilities for Process-Control monitoring of Electronic Material Properties during Solar Cell Manufacture, 9$^{th}$ Workshop on Crystalline Silicon Solar Cell Materials and Processes, NREL NREL/BK-520-26941, pp. 67-73, August, 1999; [2] R. A. Sinton and A. Cuevas, A quasi-steady-state open-circuit voltage method for solar cell characterization, Proc. of the 16th European Photovoltaic Solar Energy Conference, Glasgow, UK, 2000; [3] M. J. Kerr, A. Cuevas, R. A. Sinton, Generalized analysis of quasi-steady-state and transient decay open circuit voltage measurements, Journal of Applied Physics, AIP, 2002; [4] William Shockley, *Electrons and Holes in Semiconductors*, D. Van Nostrand Company, NY. 1950 pp. 312; and [5] U.S. Pat. No. 7,696,461.

Figure 1:
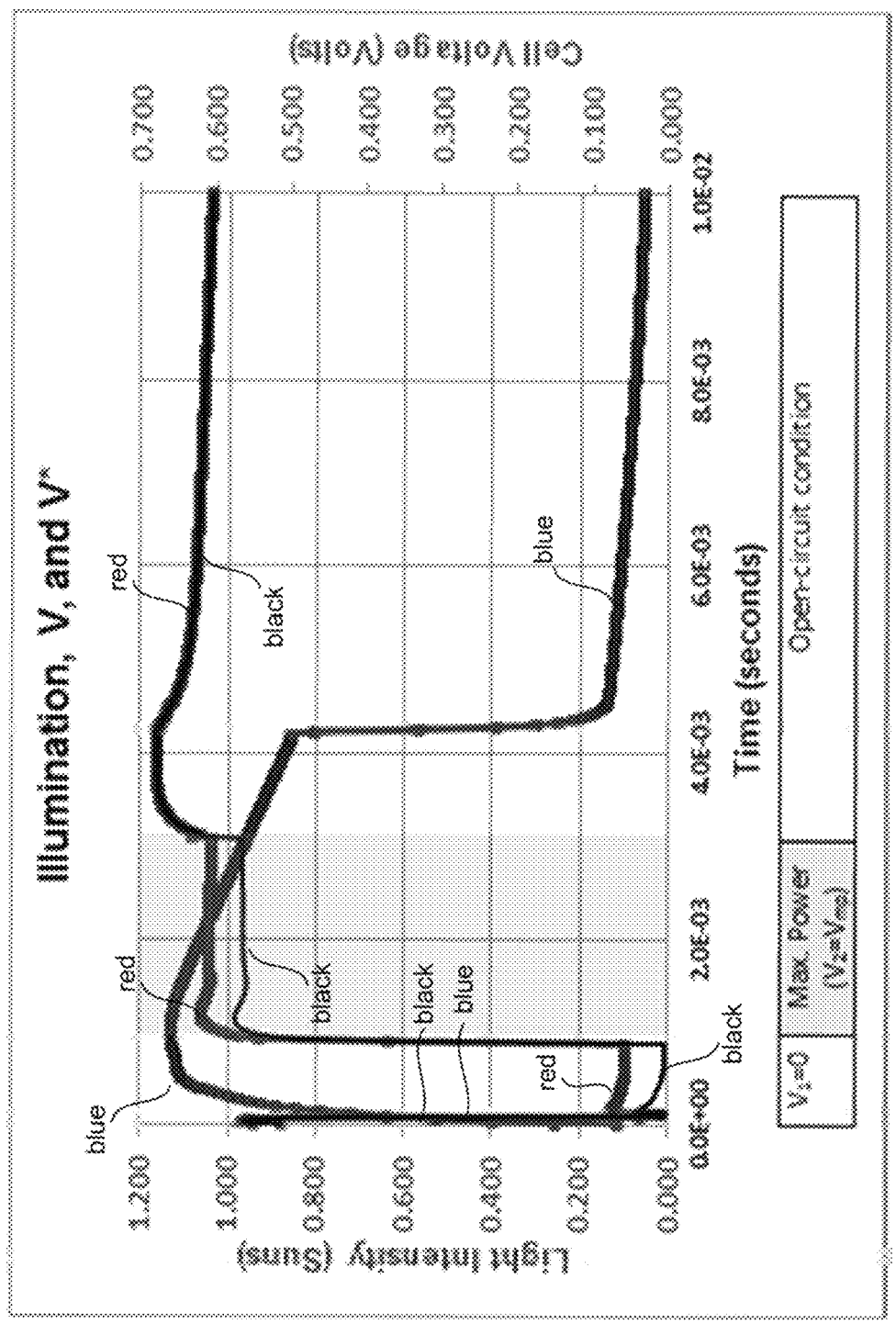

Measurement of short-circuit current, maximum power, and open-circuit voltage is shown in FIG. 1. FIG. 1 shows intensity vs. time (blue), compared to the measured terminal voltage (black), and the diode voltage, V* (red). During a light pulse, the voltage starts at 0 (short-circuit condition), it is switched to the maximum power voltage point at one sun, $V_{mp}$, using the technology and methodology in U.S. Pat. No. 7,696,461. These will be referred to as $V_1$ and $V_2$ in this description. In the particular case in this description, $V_1$ will be chosen to be the short-circuit condition with V=0, and $V_2$ will be the maximum power point $V_{mp}$.

The data during the initial 0.8 ms of the pulse is taken with the solar cell at short-circuit conditions. The voltage is then switched to the maximum power voltage conditions until 3.1 ms into the pulse (using the methodology of U.S. Pat. No. 7,696,461 in which the charge is held constant). At 3.1 ms into the pulse, the solar cell is put into open-circuit conditions. The light intensity varies during the entire pulse, but in this example, it passes through one sun during the time when the voltage is controlled to be at the maximum power point at one sun. In this example, the maximum power point is correct if the methods of U.S. Pat. No. 7,696,461 are followed at one sun and the maximum power voltage. The short-circuit current is also correct since there is negligible charge at short circuit conditions. For the open-circuit voltage points, transient corrections are required as specified below in order to determine the voltage that would be observed under steady-state conditions of constant current, voltage, and intensity.

The reference illumination intensity ($I_{ref}$) is equal to the measured illumination intensity (Suns):

$$I_{ref} = Suns \qquad \text{eq. 1}$$

The net illumination ($I_{net}$) is the illumination that would correspond to the steady state illumination giving the same diode voltage V* would be given by:

$$I_{net} = I_{ref} - \left(\frac{J}{J_{sc}}\right) - \frac{qW\frac{d(N_D + \Delta n)}{dt}}{J_{sc}} \qquad \text{eq. 2}$$

$$V^* = V + JR_s \qquad \text{eq. 3}$$

$$\left[\frac{(N_D + \Delta n)(\Delta n)}{n_i^2}\right] = e^{qV^*/kT} \qquad \text{eq. 4}$$

where $I_{ref}$ is the measured intensity, J is the measured terminal current density, $J_{sc}$ is the cell short circuit current density, q is the elementary charge, W is the cell thickness, $N_D$ is the sample doping, $\Delta n$ is the excess carrier density, V is the measured terminal voltage of the solar cell, V* is the fundamental voltage in the solar cell, without series resistance effects, and $R_s$ is the series resistance of the solar cell.

$I_{net}$ vs. V under open circuit conditions is generally referred to as the Suns-Voc curve. It is an indication of the diode characteristics free of series resistance effects, since the electron-hole pairs are created in place within the silicon, avoiding series resistance from gridlines, busbars, or lateral resistance in doped layers. No current flows in the external circuit at open-circuit conditions, so series resistance effects are minimized or absent. $I_{net}$ is the steady-state intensity that would result in the observed voltage.

Here, we propose generalizing this known Suns-Voc analysis by subtracting out a term proportional to terminal current density, (the $2^{nd}$ term in eq. 2) which allows the curve to be constructed from any data of measured intensity, voltage, and current density. Previously the Suns-Voc technique was used for open-circuit voltage conditions only. In order to accomplish this, the carrier density in eq. 2 is calculated from the terminal voltage and current as in eq. 3. The standard Suns-Voc analysis, as previously used, was based on open-circuit conditions only, and could not be used for cases where current was flowing [1-3].

The voltage, V*, is the sum of the terminal voltage with the series resistance drop ($J \times R_s$ term). This gives an average voltage in the solar cell, without the resistance drops due to busbars, gridlines, and internal series resistance effects. V* differs from the measured voltage by the series resistance, $J \times R_s$, of the solar cell.

We propose that $I_{net}$ vs. V*, eq. 2, is the fundamental steady-state Suns-Voc curve [1-3], without series resistance. It is extremely useful for device physics analysis of solar cells. Arbitrary data sets of current density, voltage, and intensity can now be analyzed to find the steady-state current and voltage under any intensity. The substrate doping level and the solar cell series resistance can also be determined.

This Suns-Voc curve can be converted to a standard steady state IV curve where the terminal current, Jss, from the solar cell is:

$$Jss = J_{sc}(1 - I_{net}) \qquad \text{eq. 5}$$

and $$V = V^* - IR_s \qquad \text{eq. 6}$$

One method to calculate doping from the data in FIG. 1 is shown below. From Eq. 2, the change in $\Delta n$ going from $V_1$ to $V_2$ is:

$$(\Delta n_2 - \Delta n_1) = \int_{V_1}^{V_2} \frac{d(N_D + \Delta n)}{dt} = \int_{V_1}^{V_2} \frac{(J_{sc}I_{ref} - J_{sc}I_{net}) - J}{qW} \qquad \text{eq. 7}$$

Equation 7, evaluated from $V_1$ to $V_2$, is the charge required to increase the diode voltage from $V_1$ to $V_2$. This equation is for an n-type substrate. For a p-type substrate $N_A$ would replace $N_D$ in eqs. 2, 4, 7, and 9.

$J_{eff}$ is the effective current density, i.e., the current density that would be present in the steady state at each of the voltages in the trace (from FIG. 1). Jsc may be determined by using a typical value.

$$J_{eff} = J_{sc}(I_{ref} - I_{net}) \qquad \text{eq. 8}$$

Figure 2:
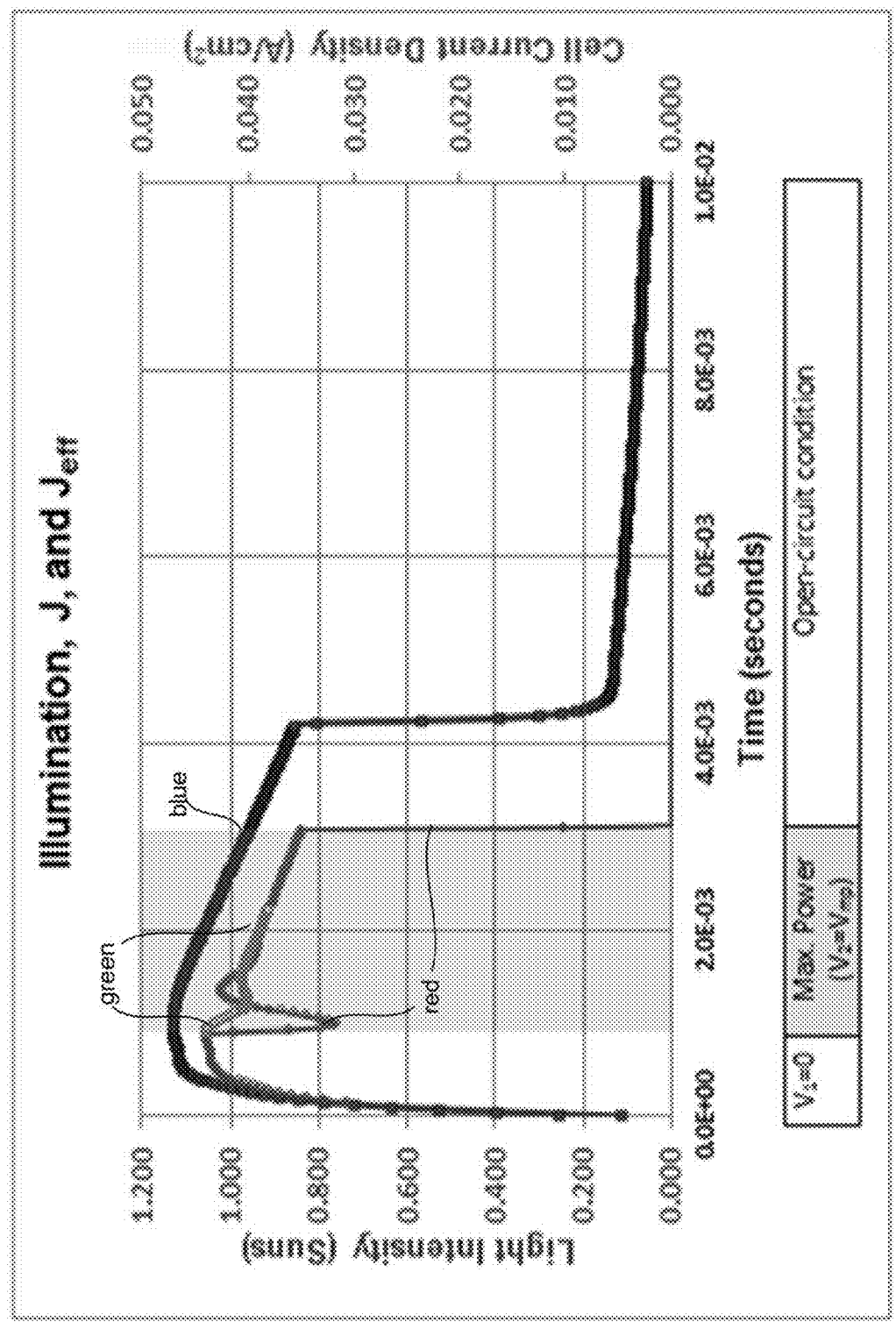
FIG. 2 shows the light intensity (blue), terminal current density (red), and effective current density (green) from eq. 8.

FIG. 2 shows the light intensity (blue), terminal current density (red), and effective current density (green) from eq. 8. The effective intensity, $I_{net}$, for each voltage is most easily evaluated from eqs. 2, 3, and 4 using data where the cell is put into an open-circuit condition, after 3.1 ms. In this case, the current density, J, is 0, simplifying the equations. Eq. 8 can then be evaluated for each $I_{ref}$ in the trace. Then the sudden drop in current density (seen as a notch at about 1 ms) is due to the charging required to increase the solar cell voltage from the short-circuit condition up to the maximum power point voltage, $V_{mp}$.

Looking at FIG. 2, the difference in the top two terms on the right-hand side of eq. 8 is shown as the difference between the green and red traces, through the region where the voltage steps up from short circuit (V=0) the maximum power point. The change in V*, diode voltage, is given by an equation from the standard textbooks [4].

$$\left[\frac{(N_D + \Delta n_2)(\Delta n_2)}{n_i^2}\right] - \left[\frac{(N_D + \Delta n_1)(\Delta n_1)}{n_i^2}\right] = e^{qV_2^*/kT} - e^{qV_1^*/kT} \quad \text{eq. 9}$$

For the voltage step from $V_1$ to $V_2$, the diode voltage steps from $V_1^*$ to $V_2^*$. In this example, $V_1^*$ is 0V and $V_2^*$ is $V_{mp}$. So, the change in $\Delta n$, determined by eq. 7, directly determines the wafer doping, $N_D$, using eq. 9. Only one value of $N_D$ will be consistent with eq. 2, 3, 4, 7 and 9 if the series resistance, $R_s$, is known.

Figure 3:
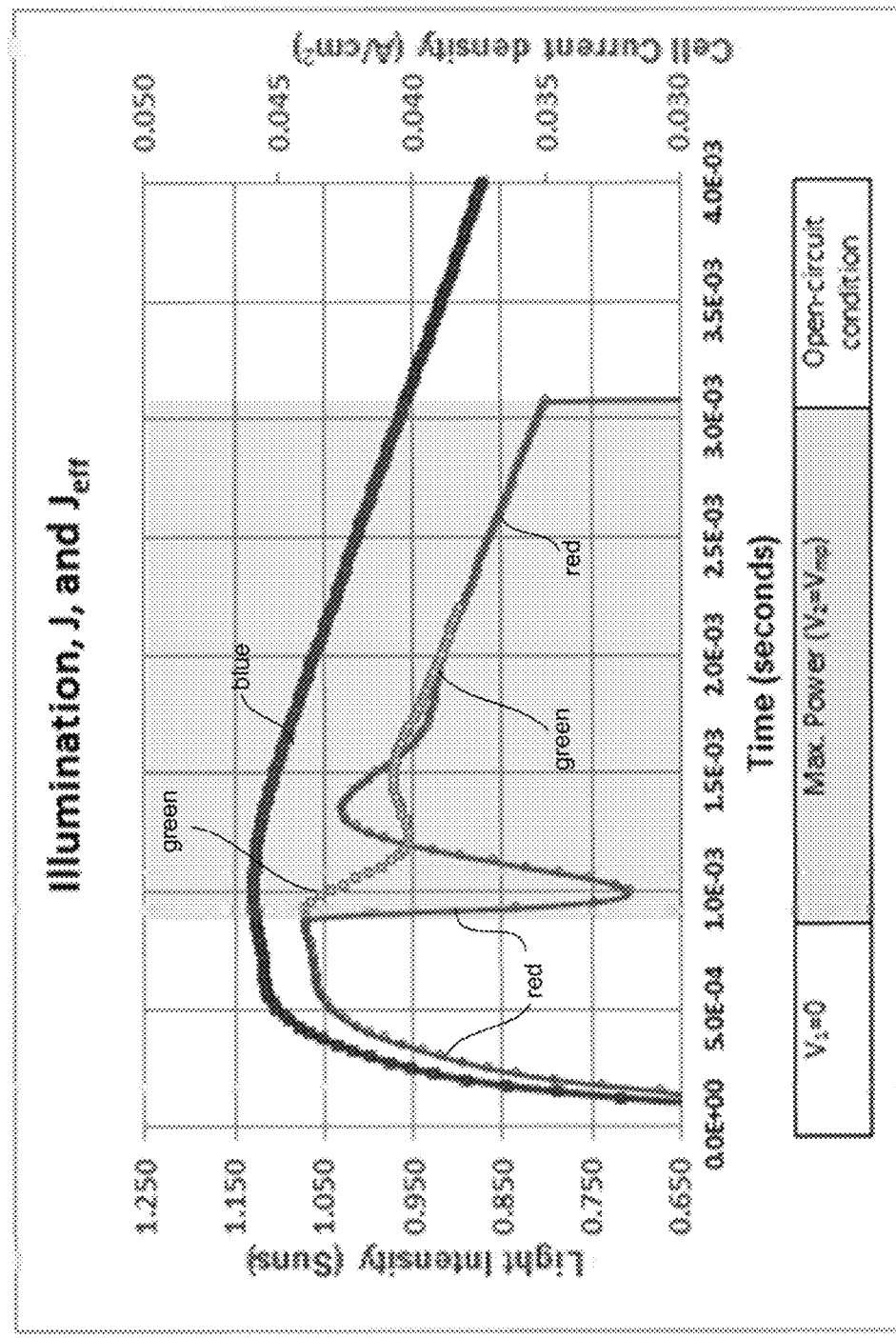
FIG. 3 shows a close up of the notch in the current density of FIG. 2 due to charging the solar cell up to a $V_{mp}$ (red), compared to the $J_{net}$ (green), the current density that would result from a steady state measurement at each voltage shown in FIG. 1.

FIG. 3 shows a close up of the notch in the current density of FIG. 2 due to charging the solar cell up to a $V_{mp}$ (red), compared to the $J_{net}$ (green), the current density that would result from a steady state measurement at each voltage shown in FIG. 1. The integrated difference between these curves is the change in charge, $\Delta n$, as indicated in eq. 7. This would be given by the integral of the green curve values minus the red curve values.

Figure 4:
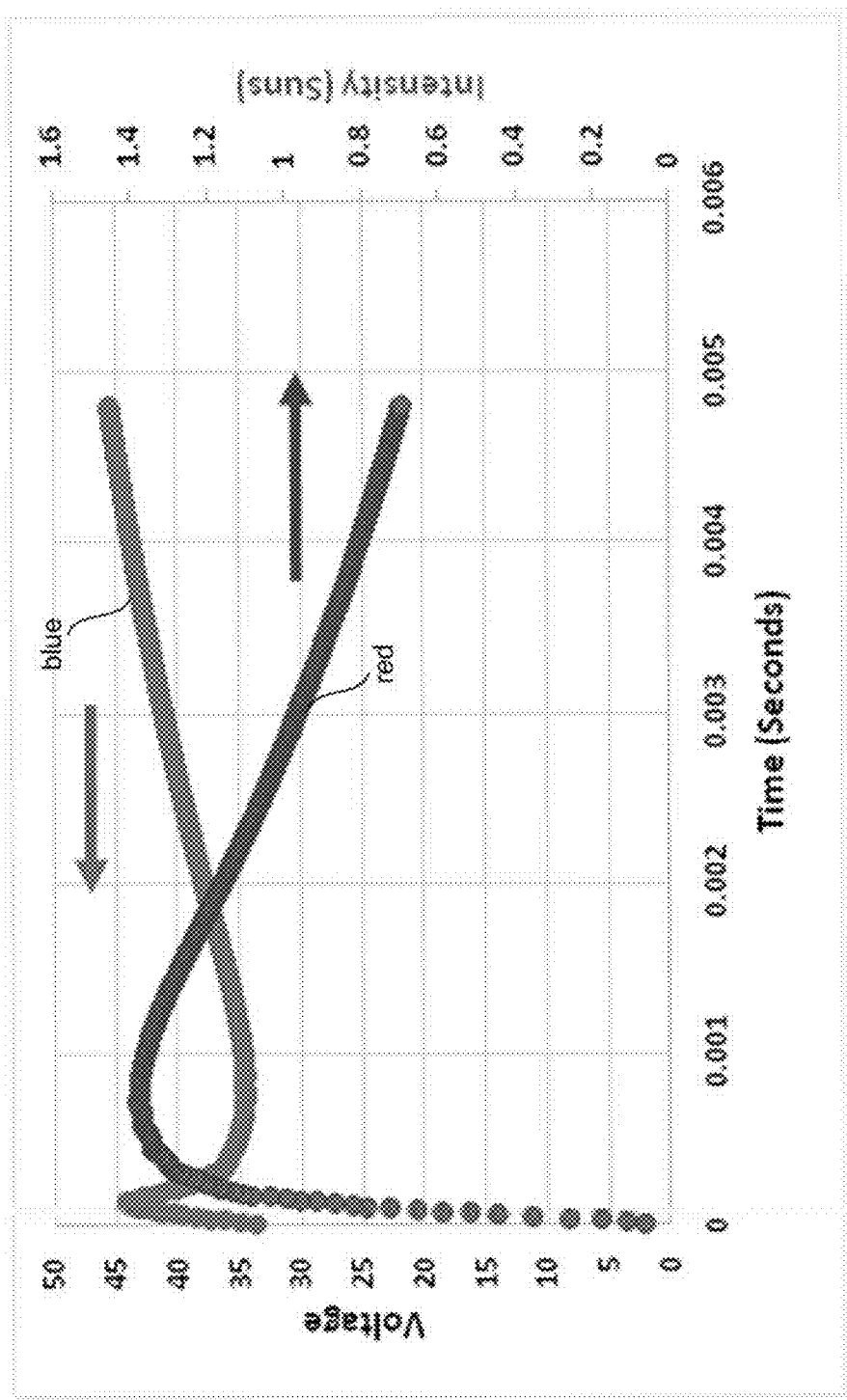
FIG. 4 shows data from a solar module taken near the maximum power point using the hardware techniques from U.S. Pat. No. 7,696,461 to vary voltage (in blue) vs. time during a flash pulse (in red).
Figure 5:
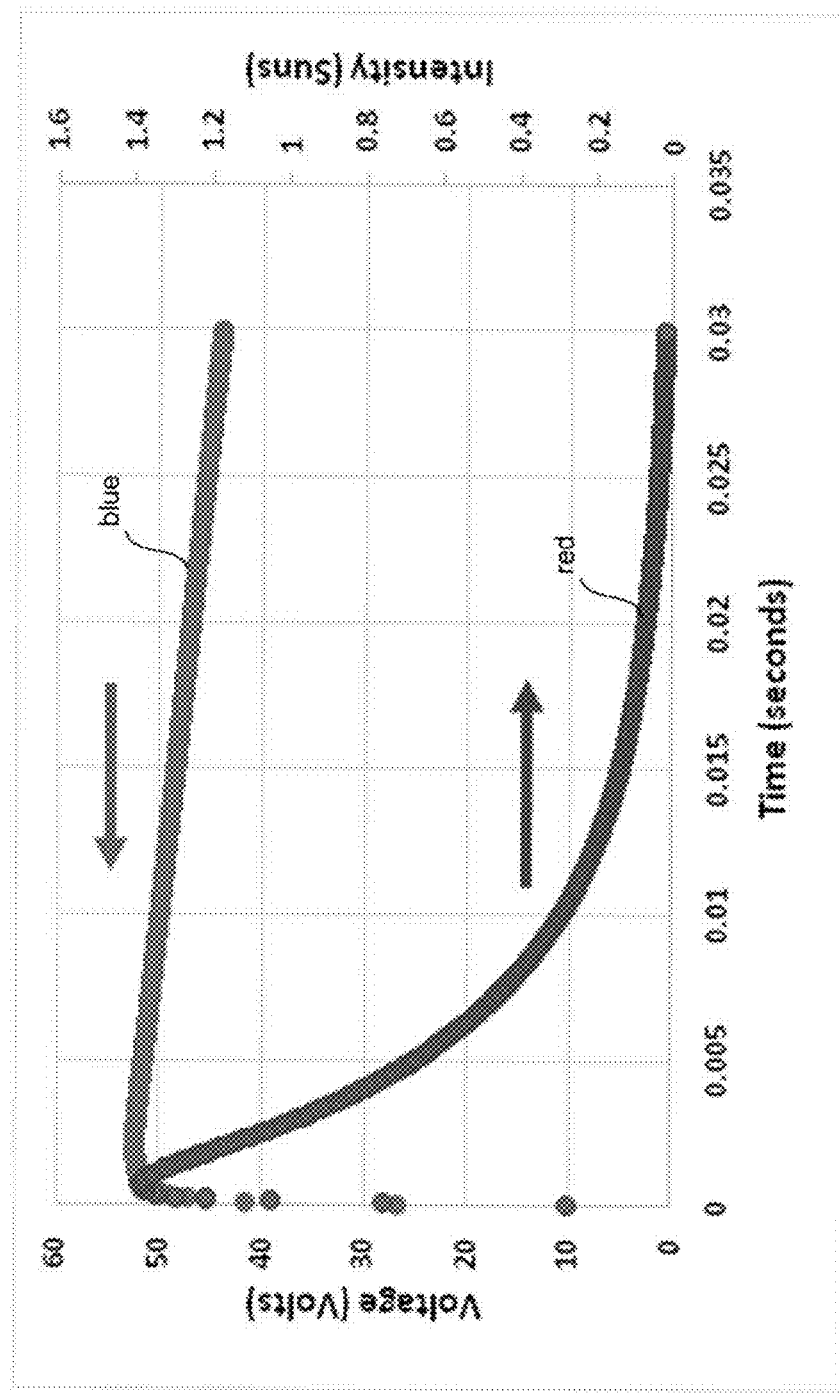
FIG. 5 shows data (voltage in blue, intensity in red) from the same module taken at open-circuit conditions, over a wide range of light intensities.

A closely-related method to determine the cell doping and the series resistance is to take data for the solar cell of module intensity, current, and voltage under two sets of conditions within the same voltage range. FIG. 4 shows data from a solar module taken near the maximum power point using the hardware techniques from U.S. Pat. No. 7,696,461 to vary voltage (in blue) vs. time during a flash pulse (in red). For example, FIG. 4 has voltage data taken near the maximum power point at one sun intensity for a high-efficiency module consisting of 72 solar cells in series. FIG. 4 also shows a ramped voltage range that encompasses the nominal anticipated maximum power point of the solar module. FIG. 5 shows data (voltage in blue, intensity in red) from the same module taken at open-circuit conditions, over a wide range of light intensities. The voltage range for these two cases overlap.

A plot of V*, from equation 3 vs. Jss from eq. 5 is shown for the two cases in FIG. 6. FIG. 6 shows the evaluation of the data from FIGS. 4 and 5 using equations 2, 3, 4, 5, and 6. A value of Jsc may be assumed to be a typical value. The red curve is V* is from the FIG. 4 data and the black curve is V* from the FIG. 5 data. The series resistance and doping in these equations are treated as free parameters used to match the curves. When the red and black curves are matched, the doping and series resistance have been uniquely determined. Furthermore, these curves correspond to the steady-state curves without series resistance and can be constructed from data taken under arbitrary conditions of illumination, voltage, and current vs. time. The curve V*–J× Rs is shown in green. This corresponds to the terminal voltage that would be measured at the solar cell or module. The constraint of taking data under constant charge conditions, specified in U.S. Pat. No. 7,696,461, is not required to determine the steady-state results for the module or cells due to the use of transient correction terms as specified in these equations. A range of data, as shown in red, can be scanned. The actual steady-state maximum power point for the module is shown as the black diamond. For this module, the cell doping was determined to be $5.94 \times 10^{15}$ cm$^{-3}$ and the series resistance was determined to be 1.35 ohm-cm$^2$. The doping ($N_D$ if the substrate is doped n-type) and the series resistance, $R_s$, are used as free parameters until the curves from the two data sets agree. When this agreement is achieved between the red and black curves, the doping and the series resistance parameters are uniquely determined.

This technique can be used to compare data taken while varying intensity vs. time, voltage vs. time, or current vs. time, or all three varying simultaneously. The set of parameters for $R_s$ and doping that best trace the same curve of Jss vs. V* is used to determine $R_s$ and the doping. In the case that no current is drawn from the cell, the result is independent of $R_s$, and can be used to determine doping.

The two sets of data to be compared can be obtained during one measurement. In FIG. 1, the same voltage range, around 620 mV, is present both while drawing current from the cell, and later in the pulse when the cell is placed into an open-circuit condition. Therefore, the doping and series resistance can be determined by comparing data taken within one measurement sequence as well as with two measurements as described above. The analysis requires knowledge of $R_s$, or it is found as the value most self-consistent with the results.

Determining the doping and series resistance, as well as the steady-state short-circuit current density, current density and open-circuit voltage can also be performed during a single flash while using a ramped voltage that spans the maximum power point of the solar cell or module. FIG. 8 is an illustration of the voltage profile (black) sequence that would acquire all of the data required for the analysis in FIG. 6 in a single flash (light intensity in red). In addition, the short-circuit current (amperes per sun) is acquired during the first ms of data. Following this first ms, the ramped voltage spanning the maximum power point (as in FIG. 4) is acquired during the time interval from 1 ms to 4.8 ms. The open circuit voltage data is taken from 4.8 ms to 35 ms. The data from 1 ms onward would reproduce the results in FIG. 6, when the correct doping and series resistance Rs were used in the equations 2-6. The same data is present in this single flash acquisition as in the two flash sequence illustrated by FIGS. 4 and 5. In order to determine an appropriate V* vs. Jss curve (or two curves, in the case of two light pulses) an initial curve is produced by choosing likely values for the doping and series resistance parameters. Then, iteration is performed over possible values for the doping and series resistance parameters until the data becomes self-consistent, i.e., until the curve retraces over itself (or until the two curves are superimposed), at which point the doping and series resistance parameters are determined.

FIG. 9 shows the evaluation that would result from the sequence in FIG. 8 using equations 2, 3, 4, 5, and 6. The black dot is from the first ms and is used to report Jsc. The red curve results from the data from 1 ms to 4.8 ms. The black curve results from the region from 4.8 ms-35 ms. Finally, the green curve is from eq. 3, converting V* to V. Thus, the retracing of the black curve over the red curve as shown is the result of iterating of possible values for the doping and series resistance parameters until the data becomes self-consistent, as described above.

An alternative method to determine $R_s$ is demonstrated in FIG. 7. FIG. 7 is a close up of FIG. 1. Since the charge in the solar cell cannot change instantaneously, the measured voltage V (black) steps abruptly up to V* (red) when the current is abruptly turned off, since J drops to 0 in eq. 3. Then V=−V*, with the current off, and the voltage increases toward open-circuit conditions. The height of the vertical step, indicated by the vertical distance from the measured voltage curve to the corner in the V* curve, is J×$R_s$. V* is a continuous curve with no abrupt vertical steps, since the charge in a solar cell cannot change instantaneously under open-circuit conditions. Ideally, the step in the black curve up to the V* curve would be vertical, with sufficient resolution and an optimized low-inductance circuit.

By abruptly stepping the voltage from the maximum power point condition to open circuit conditions at 3.1 ms, the series resistance voltage drop in eq. 3 abruptly disappears, since the current density, J, goes to 0. This shows as a vertical step in the voltage. The measured voltage, V, instantly becomes the diode voltage V*, because there is no longer any current flowing from the diode through the emitter, the gridlines, or the busbars. The voltage within the solar cell is determined by the charge, which cannot change instantaneously. The height of this step is the current density times the series resistance J×$R_s$. This is an independent way of measuring the series resistance.

Therefore, using the circuit diagram and techniques from U.S. Pat. No. 7,696,461, the short circuit current density, maximum power point, Suns-Voc curve, series resistance, $R_s$, at the maximum power point (or at any other operating point), and substrate doping can all be determined within one light pulse, or by using several pulses.

To obtain the data in FIG. 1 with the circuit in U.S. Pat. No. 7,696,461 (FIG. 10 in that patent or similar), the reference voltage $V_{ref}$ is stepped from the voltage that results in a terminal voltage of 0, to the voltage resulting in $V_{mp}$. Subsequently, this reference voltage is stepped to high voltage, turning the transistor off. In addition, Jsc may be determined by measuring J at V=0 or by using a typical value for Jsc. Jsc is generally within a tight range of +/−5%.

To obtain the trace shown in FIG. 4, the reference voltage $V_{ref}$ is stepped from the voltage that results in a terminal voltage of 0, and then ramped in the voltage range resulting in a range of voltages near $V_{mp}$. Subsequently, this reference voltage is stepped to high voltage, turning the transistor off.

The analysis described here is perfectly general, and could be used with any light-intensity vs. time profile or light source. For example, the light source could be xenon flashlamps, incandescent lamps, fluorescent lamps, or LEDs. Also, the number of voltage steps or ramps could be varied as well as the choice of set-point voltage ranges from the short-circuit to the open-circuit condition. The voltage steps need not be in any particular order.

Computer System Embodiment

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of determining parameters of a solar cell or module, said method comprising:

applying a light pulse having a varying intensity to said solar cell or module while keeping said solar cell or module in a short-circuit condition;

switching a terminal voltage of said solar cell or module to a ramped voltage range encompassing the nominal anticipated maximum power point of said solar cell or module;

placing said solar cell or module into an open-circuit condition to produce a voltage step in said terminal voltage of said solar cell or module;

measuring said terminal voltage, said current density, and said intensity during said light pulse until said terminal voltage is lower than a typical maximum power voltage of said solar cell or module;

determining a diode voltage (V*) vs. steady-state current density (Jss) curve using said measured terminal voltage, current density and intensity; and varying a substrate doping level parameter ($N_D$ or $N_A$) and a series resistance parameter ($R_s$) as free parameters such that said curve retraces over itself as said terminal voltage decreases.

2. The method as recited in claim 1 further comprising:
calculating the expected steady-state current density, Jss, and steady-state voltage, V, of said solar cell or module; and
outputting said expected steady-state current density, Jss, and steady-state voltage, V.

3. The method as recited in claim 2 further comprising:
calculating said expected steady-state current density, Jss, and steady-state voltage, V, of said solar cell or module using the equations $Jss=J_{sc}(1-I_{net})$ and $V=V^*-JR_s$, where $J_{sc}$ is the solar cell short-circuit current density, $I_{net}$ is a net illumination, V is the measured terminal voltage of the solar cell, V* is the fundamental voltage in the solar cell, and J is measured terminal current density.

4. The method as recited in claim 1 further comprising:
determining said curve by using the equations $$I_{net} = I_{ref} - \left(\frac{J}{J_{sc}}\right) - \frac{qW\frac{d(N_D + \Delta n)}{dt}}{J_{sc}},$$

$$V^* = V + JR_s, \left[\frac{(N_D + \Delta n)(\Delta n)}{n_i^2}\right] = e^{qV^*/kT},$$

$$Jss = J_{sc}(1 - I_{net}) \text{ and } V = V^* - JR_s,$$

where $I_{ref}$ is the measured intensity, J is the measured terminal current density $J_{sc}$ is the cell short circuit current density, q is the elementary charge, W is the cell thickness, $N_D$ is the substrate doping level, $\Delta n$ is the excess carrier density, V is the measured terminal voltage of the solar cell, V* is the fundamental voltage in the solar cell, $R_s$ is the series resistance, $n_i$ is the intrinsic carrier density, k is the Boltzmann constant, and T is temperature in Kelvin.

5. The method as recited in claim 1 wherein
outputting a substrate doping level and a series resistance ($R_s$) that produce said retracing of said curve over itself.

6. The method as recited in claim 1 further comprising:
determining a short-circuit current density, Jsc, by calculating (current density)/intensity when the terminal voltage is zero.

7. The method as recited in claim 1 wherein said measuring is done under conditions of time variant current, time-variant light intensity, and time variant voltage.

8. A method of determining parameters of a solar cell or module, said method comprising:

applying a light pulse having a varying intensity to said solar cell or module while keeping said solar cell or module in a short-circuit condition;

switching a terminal voltage of said solar cell or module from a first voltage to a second voltage and then maintaining a constant charge in said solar cell or module by varying said terminal voltage;

placing said solar cell or module into an open-circuit condition to produce a voltage step in said terminal voltage of said solar cell or module;

measuring said terminal voltage and said intensity during said light pulse until said terminal voltage is lower than a typical maximum power voltage of said solar cell or module;

determining a diode voltage (V*) vs. steady-state current density (Jss) curve using said measured terminal voltage and intensity; and varying a substrate doping level parameter ($N_D$ or $N_A$) and a series resistance parameter ($R_s$) as free parameters such that said curve retraces over itself as said terminal voltage decreases.

9. The method as recited in claim 8 further comprising:
calculating the expected steady-state current density, Jss, and steady-state voltage, V, of said solar cell or module; and
outputting said expected steady-state current density, Jss, and steady-state voltage, V.

10. The method as recited in claim 9 further comprising:
calculating said expected steady-state current density, Jss, and said steady-state voltage, V, of said solar cell or module using the equations $Jss=J_{sc}(1-I_{net})$ and $V=V^*-JR_s$, where $J_{sc}$ is the solar cell short-circuit current density, $I_{net}$ is a net illumination, V is the measured terminal voltage of the solar cell, V* is the fundamental voltage in the solar cell, $R_s$ is the series resistance, and J is the measured terminal current density.

11. The method as recited in claim 8 further comprising:
determining said curve by using the equations $$I_{net} = I_{ref} - \left(\frac{J}{J_{sc}}\right) - \frac{qW\frac{d(N_D + \Delta n)}{dt}}{J_{sc}},$$

$$V^* = V + JR_s, \left[\frac{(N_D + \Delta n)(\Delta n)}{n_i^2}\right] = e^{qV^*/kT},$$

$$Jss = J_{sc}(1 - I_{net}) \text{ and } V = V^* - JR_s,$$

where $I_{ref}$ is the measured intensity, J is the measured terminal current density $J_{sc}$ is the cell short circuit current density, q is the elementary charge, W is the cell thickness, $N_D$ is the substrate doping level, $\Delta n$ is the excess carrier density, V is the measured terminal voltage of the solar cell, V* is the fundamental voltage in the solar cell, $R_s$ is the series resistance, $n_i$ is the intrinsic carrier density, k is the Boltzmann constant, and T is temperature in Kelvin.

12. The method as recited in claim 8 further comprising:
outputting a substrate doping level and a series resistance ($R_s$) that produce said retracing of said curve over itself.

13. The method as recited in claim 8 further comprising:
determining a short-circuit current density, Jsc, by calculating (current density)/intensity when the terminal voltage is zero.

14. The method as recited in claim 8 wherein said measuring is done under conditions of time variant current, time-variant light intensity, and time variant voltage.

15. A method of determining parameters of a solar cell or module comprising:
applying a first light pulse to said solar cell or module;
varying a terminal voltage, a terminal current or both during said first light pulse and recording a first data set including said terminal voltage and an intensity of said first light pulse;
applying a second light pulse to said solar cell or module;
varying said terminal voltage, said terminal current or both during said second light pulse and recording a second data set including said terminal voltage and an intensity of said first light pulse, wherein a terminal voltage vs. time profile during said second light pulse is different from a terminal voltage vs. time profile during said first light pulse;
determining a diode voltage (V*) vs. steady-state current density (Jss) curve for each of said data sets; and
varying a substrate doping level parameter ($N_D$ or $N_A$) and a series resistance parameter ($R_s$) as free parameters such that said curves become superimposed.

16. The method as recited in claim 15 further comprising:
determining the expected steady-state current density, Jss, and steady-state voltage, V, of said solar cell or module; and
outputting said expected steady-state current density, Jss, and said steady-state voltage, V.

17. The method as recited in claim 16 further comprising:
calculating said expected steady-state current density, Jss, and said steady-state voltage, V, of said solar cell or module using the equations $Jss=J_{sc}(1-I_{net})$ and $V=V^*-JR_s$, where $J_{sc}$ is the solar cell short-circuit current density, $I_{net}$ is a net illumination, V is the measured terminal voltage of the solar cell, V* is the fundamental voltage in the solar cell, $R_s$ is the series resistance, and J is the measured terminal current density.

18. The method as recited in claim 15 further comprising:
determining said curves by using the equations $$I_{net} = I_{ref} - \left(\frac{J}{J_{sc}}\right) - \frac{qW\frac{d(N_D + \Delta n)}{dt}}{J_{sc}},$$

$$V^* = V + JR_s, \quad \left[\frac{(N_D + \Delta n)(\Delta n)}{n_i^2}\right] = e^{qV^*/kT},$$

$$Jss = J_{sc}(1 - I_{net}) \text{ and } V = V^* - JR_s,$$

where $I_{ref}$ is the measured intensity, J is the measured terminal current density $J_{sc}$ is the cell short circuit current density, q is the elementary charge, W is the cell thickness, $N_D$ is the substrate doping level, $\Delta n$ is the excess carrier density, V is the measured terminal voltage of the solar cell, V* is the fundamental voltage in the solar cell, $R_s$ is the series resistance, $n_i$ is the intrinsic carrier density, k is the Boltzmann constant, and T is temperature in Kelvin.

19. The method as recited in claim 15 further comprising:
outputting a substrate doping level and a series resistance ($R_s$) that produce said superimposition of said curves.

20. The method as recited in claim 15 further comprising:
determining a short-circuit current density, Jsc, for use in said determining said curve.

21. A method of determining a substrate doping level of a solar cell or module, said method comprising:
applying a light pulse to said solar cell or module while maintaining constant a terminal voltage at a first voltage or maintaining constant a first charge of said solar cell or module;
switching said terminal voltage of said solar cell or module to a second higher voltage if said first voltage was maintained, or switching said first charge to a second greater charge if said first charge was maintained;
determining a change in charge density of said solar cell or module as a result of said increase in said terminal voltage or as a result of said increase of said first charge to said second greater charge; and
calculating said substrate doping level using said change in charge density.

22. The method as recited in claim 21 wherein said first terminal voltage is 0 volts and said second terminal voltage is a maximum power voltage of said solar cell or module.

23. The method as recited in claim 21 wherein said change in charge density is determined using the equation 7

$$(\Delta n_2 - \Delta n_1) = \int_{t@V_1}^{t@V_2}\left[\frac{d(N_D + \Delta n)}{dt}\right]dt = \int_{t@V_1}^{t@V_2}\left[\frac{(J_{sc}I_{ref} - J_{sc}I_{net}) - J}{qW}\right]dt,$$

where $N_D$ is the substrate doping level, $\Delta n$ is the excess carrier density, $I_{ref}$ is the measured intensity, $I_{net}$ is a net illumination, J is the measured terminal current density, $J_{sc}$ is the cell short circuit current density, q is the elementary charge, W is the cell thickness, $V_1$ is the first voltage, and $V_2$ is the second voltage.

24. The method as recited in claim 21 wherein said substrate doping level is determined using the equation $$\left[\frac{(N_D + \Delta n_2)(\Delta n_2)}{n_i^2}\right] - \left[\frac{(N_D + \Delta n_1)(\Delta n_1)}{n_i^2}\right] = e^{qV_2^*/kT} - e^{qV_1^*/kT}$$

where $N_D$ is the substrate doping level, $\Delta n_1$ is an initial excess carrier density when $V^*=V_1^*$, $\Delta n_2$ is a second excess carrier density when $V^*=V_2$, $n_i$ is the intrinsic carrier density, q is the elementary charge, V1* is a first diode voltage, V2* is a second diode voltage, k is the Boltzmann constant, and T is temperature in Kelvin.

25. The method as recited in claim 21 wherein said first voltage or said first charge is changed abruptly.

26. The method as recited in claim 21 further comprising:
determining a short-circuit current density, Jsc.

27. A method of determining a series resistance of a solar cell or module, said method comprising:
applying a light pulse to said solar cell or module while keeping said solar cell or module in a short-circuit condition;
switching a terminal voltage of said solar cell or module to a maximum power voltage, Vmp, and then holding a charge of said solar cell or module constant by varying said terminal voltage;
placing said solar cell or module into an open-circuit condition to produce a voltage step, Vstep, in said terminal voltage; and
determining said series resistance, Rs, using the formula Vstep=current density×Rs.

28. The method as recited in claim 27 wherein said terminal voltage steps up to a diode voltage of said solar cell.

* * * * *